(12) United States Patent
Tanaka (10) Patent No.: US 6,303,741 B1
(45) Date of Patent: Oct. 16, 2001

(54) SOLID PHASE-POLYMERIZED POLYAMIDE POLYMER

(75) Inventor: Kazumi Tanaka, Niigata-ken (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/502,569

(22) Filed: Feb. 11, 2000

(30) Foreign Application Priority Data

Feb. 16, 1999 (JP) .................................................. 11-036766
Feb. 16, 1999 (JP) .................................................. 11-036767

(51) Int. Cl.$^7$ .................................................. C08G 69/28
(52) U.S. Cl. .......................... 528/332; 170/310; 170/322; 170/335; 170/336; 170/480
(58) Field of Search .................................... 528/170, 310, 528/322, 332, 335, 336, 480

(56) References Cited

U.S. PATENT DOCUMENTS

| | | | | |
|---|---|---|---|---|
| 5,268,219 | * | 12/1993 | Harada et al. | 428/220 |
| 5,403,910 | | 4/1995 | Kosinski et al. | 528/336 |
| 5,576,415 | * | 11/1996 | Tanaka | 528/310 |

FOREIGN PATENT DOCUMENTS

| | | |
|---|---|---|
| 0596702 | 5/1994 | (EP) . |
| 0940444 | 9/1999 | (EP) . |
| 49-28679 | 7/1974 | (JP) . |
| 50-2197 | 1/1975 | (JP) . |
| 56-149431 | 11/1981 | (JP) . |
| 57-200420 | 12/1982 | (JP) . |
| 58-111829 | 7/1983 | (JP) . |
| 1-284526 | 11/1989 | (JP) . |
| 2-245026 | 9/1990 | (JP) . |
| 4-197710 | 7/1992 | (JP) . |
| 7-90076 | 4/1995 | (JP) . |

* cited by examiner

Primary Examiner—P. Hampton-Hightower
(74) Attorney, Agent, or Firm—Antonelli, Terry, Stout & Kraus, LLP (57) ABSTRACT

A solid phase-polymerized polyamide produced by solid phase polymerization of a melt-polymerized polyamide which has a specific relative viscosity and end group balance and is obtained by polycondensing a diamine component mainly comprising m-xylylenediamine with a dicarboxylic acid component mainly comprising adipic acid in molten state. The solid phase-polymerized polyamide is a medium to high viscosity polymer having a specific relationship between the relative viscosity and the number average molecular weight. With such particular properties, the solid phase-polymerized polyamide contains gels and fish eyes in extremely small amounts, and is suitable as a material particularly for producing bottle, sheet, film and fiber.

18 Claims, 1 Drawing Sheet

FIG. 1

SOLID PHASE-POLYMERIZED POLYAMIDE POLYMER

FIELD OF THE INVENTION

The present invention relates to a solid phase-polymerized polyamide suitable for various applications such as bottles, sheets, films, fibers or the like. More particularly, the present invention relates to a solid phase-polymerized polyamide produced by a step of melt-polycondensing a diamine component composed mainly of m-xylylenediamine with a dicarboxylic acid component composed mainly of adipic acid, and a subsequent step of heating the resultant polyamide while keeping it in solid phase. The solid phase-polymerized polyamide according to the present invention is a medium- to high-viscosity polyamide containing gels or fish eyes in extremely small amount, in which the increase in the molecular weight (increase in viscosity) is achieved by linear molecular growth mainly due to amide bond formation during the solid phase polymerization. Also, the solid phase-polymerized polyamide according to the present invention is a medium- to high-viscosity polyamide containing gels or fish eyes in extremely small amount and having a uniform polymerization degree, which is produced using a batchwise heating apparatus.

BACKGROUND OF THE INVENTION

Generally, polyamides for molding materials have been molded into shaped articles by injection molding or the like. Therefore, polyamides have been required to have a high fluidity upon melting, i.e., low viscosity polyamides have been used as the molding materials. However, when applied to production of bottles, sheets, films, fibers or the like, polyamides are molded into shaped by extrusion in addition to injection molding. Therefore, the polyamides for use in these applications are required to have a lower fluidity than those of the polyamide for use as the molding materials, and medium- to high-viscosity polyamides have been used.

As low-viscosity polyamides to be used mainly as the molding materials, polyamides obtained by melt-polycondensation have been used directly or after drying. However, when it is intended to obtain medium- to high-viscosity polyamides applicable to production of bottles, sheets, films, fibers or the like by the melt-polycondensation, a special polymerization reactor is needed to keep the contents in a polymerization reactor in uniform molten state, because ordinary agitators cannot produce agitating force sufficient for maintaining the uniform molten state. Further, when the polycondensation is continued until a low-viscosity polyamide is converted to a medium- to high-viscosity polyamide, the time required for maintaining the molten state (reaction time) is considerably prolonged. As a result, there arises damage of polyamide molecules (deteriorated polymer molecules due to generation of radicals), or occurrence of aberrant reactions such as non-linear molecular growth (production of three-dimensional polymers), thereby increasing the amount of gels and fish eyes which causes disadvantages in practical use. If such polyamides containing a large amount of gels and fish eyes are used for production of bottles, sheets, films, fibers or the like, defective products occur with extremely high frequency, resulting in deteriorated productivity. Even though a filter is used upon molding, it is difficult to completely remove gels and fish eyes from polyamides. Further, the filter must be replaced with new ones more frequently, this reducing the continuous production run. Therefore, it is desirable that the amount of gels and fish eyes in polyamides is as small as possible.

It is known that medium- to high-viscosity polyamide containing gels or fish eyes in small amount can be obtained by producing low-viscosity polyamide by melt-polycondensation, and then heat-treating the resultant low-viscosity polyamide in solid phase (so-called solid phase polymerization). The difference in the amounts of gels or fish eyes between melt-polycondensation and solid phase polymerization is attributable to the difference in the frequency of occurrence of damages to polyamide molecules and aberrant reactions due to different reaction temperatures. Thus, medium- to high-viscosity polyamide obtained by solid phase polymerization contain gels or fish eyes in smaller amount as compared with those obtained only the melt-polycondensation. However, in the production of bottles, sheets, films, fibers or the like, the productivity of these products is considerably affected even when gels or fish eyes are present in slight amounts. Therefore, it has been demanded to further reduce the amounts of gels or fish eyes in solid phase-polymerized polyamides.

Gels or fish eyes are formed not only during the production of polyamides but also during the melting for molding polyamides into shaped articles. Even though polyamides show no considerable difference in the amounts of gels or fish eyes, molded articles contain, in some cases, different amounts of gels or fish eyes. One reason therefor may be that slight differences in damages to polyamide molecules and slight differences in the occurrence of aberrant reactions, which are not detected just after the production of polyamides, are increased by stagnation of polyamides in filter, molding die, etc. during the molding process. Thus, to obtain molded articles containing gels or fish eyes in small amounts, it is necessary to design a special molding apparatus having few stagnating portions where polyamides are retained not flowing. Simultaneously, it is essentially required to produce high-quality polyamides by preventing damages to molecules and aberrant reactions in melt-polymerization and solid phase polymerization.

Amorphous polyamide granules, i.e., granules of poly-m-xylylene adipamide having a crystallinity of not more than 13% transfer from amorphous state to crystalline state when heated to a temperature higher than a glass transition temperature. The amorphous polyamide granules abruptly become tacky when heated to near the glass transition temperature, and remain tackiness until the polyamide is crystallized. Solid phase polymerization is effected by the heat transferred from a heating medium kept at a temperature higher than that of the polyamide. When polyamide granules fail to move freely and stagnate in the vicinity of heat transfer surface of inner wall of a heating apparatus, the polyamide granules tackifiedly stick to the wall surface of the heating apparatus. Also, the polyamide granules tackifiedly stick to each other to form massive granules. When the tackifiedly stuck granules are crystallized without disintegration, there arises disadvantage of solidified sticking of the granules. If solid phase polymerization is continued after crystallization without disintegration of the solidified sticky massive granules, solid phase-polymerized polyamides having a uniform degree of polymerization cannot be obtained. In addition, damages to polyamide molecules and aberrant reactions are likely to occur due to partial heating, thereby inducing the formation of gels or fish eyes.

To avoid the above disadvantages, there have been generally employed the following processes in subjecting amorphous polymers to solid phase polymerization:
(a) Batchwise process where polymer is heated gently in a batchwise heating apparatus such as a rotary drum in an inert gas atmosphere or under reduced pressure, thereby crystallizing the polymer while avoiding the tackified sticking of the polymer granules, and then further heating the polymer in the same heating apparatus to carry out solid phase polymerization;

(b) Continuous process where the polymer is heated in a channel stirring heating apparatus in an inert gas stream to crystallize the polymer (pre-crystallization), and then the crystallized polymer is subjected to solid phase polymerization in a hopper heating apparatus in an inert gas stream.

(c) Semi-continuous process where the polymer is crystallized in a channel stirring heating apparatus, and then the crystallized polymer is subjected to solid phase polymerization in a batchwise heating apparatus such as a rotary drum.

The following problems arise when solid phase polymerization of an amorphous polyamide constituted by a diamine component composed mainly of m-xylylenediamine and a dicarboxylic acid component composed mainly of adipic acid is carried out by following the above conventional processes.

In a batchwise heating apparatus such as rotary drum as used in the above process (a), agitation and mixing sufficient for disintegrating massive granules formed by tackified sticking and solidified sticking of polyamide granules cannot be obtained, so that the rotation of the rotary drum is disturbed and problems of decentering and power fluctuation occur. Therefore, it has been attempted to employ operational conditions capable of avoiding the tackified sticking of polyamide granules. Specifically, the temperature of heating medium is kept low so as to reduce the temperature rise rate of polyamide granules until the crystallization is completed, or polyamide granules are vigorously moved by reducing a filling rate and increasing a rotational speed of the rotary drum. However, it has been very difficult to avoid the tackified sticking of polymer granules over a period after reaching the glass transition temperature and until completing the crystallization. Therefore, the amount of polymer granules to be charged into the drum must be reduced to a level causing no mechanical trouble even though the tackified sticking of polymer granules occur. Thus, the decrease in productivity is unavoidable in the conventional processes.

Although a channel stirring heating apparatus as used in the processes (b) and (c) is effective for mechanically disintegrating massive granules of takifiedly sticky polyamide and solidifiedly sticky polyamide, it is still required that the temperature of heating medium is kept low until the crystallization of polyamide granules is completed so as to prevent polyamide granules from tackifiedly sticking to inner wall and agitation blades of the heating apparatus. Further, since the channel stirring heating apparatus cannot be sufficiently sealed as compared with a rotary drum, the heating apparatus is not suitable for treating polymers such as polyamide which is susceptible to yellowing due to thermal oxidation, even when polymers are heated in an inert gas stream. Also, the channel stirring heating apparatus requires a large amount of highly-pure inert gas. In addition, a larger amount of powders is generated as compared with using a rotary drum, resulting in contamination of polyamide granules.

Japanese Patent Publication No. 49-28679(1974) discloses a process for producing polyamide 6 and polyamide 12. In the proposed process, a low-viscosity polyamide obtained by polymerization in the presence of specific amounts of an organic acid, as a chain stabilizer, selected from monocarboxylic acids and dicarboxylic acids, and an inorganic or mineral acid as a polymerization catalyst is subjected to solid phase polymerization. The solid phase polymerization is carried out by heating the low-viscosity polyamide for a long period of time until the viscosity of polyamide reaches a certain final value independent of the residence time. In this process, since the inorganic or mineral acid not only acts as a catalyst for amidation reaction but also accelerates aberrant reactions mentioned above, the formation of gels are apparently unavoidable especially in the polyamide of the present invention. In addition, the reaction time of solid-phase polymerization is prolonged merely until the polymer reaches an equilibrium molecular weight at the reaction temperature. Therefore, it is difficult to reduce the amounts of gels or fish eyes in the polyamide of the present invention by the proposed process.

Japanese Patent Publication No. 50-2197(1975) discloses a process for producing polyamide 6, which comprises pre-treatment of polyamide 6 pellets by adding water thereto so as to adjust the water content to not less than 1.0% by weight and then heating the pellets under pressure, and solid phase polymerization of the polyamide pellets after drying, thereby shortening the reaction time of solid phase polymerization. In this process, the pre-treatment is carried out in the presence of water vapor to reduce the reaction time of solid phase polymerization. In the pre-treatment, since no sufficient molecular growth is achieved, it is not considered that damages to polyamide molecules and occurrence of aberrant reactions during the solid phase polymerization can be effectively prevented. Further, the process requires the use of a pressure-type heating apparatus.

Japanese Patent Application Laid-Open No. 7-90076 (1995) discloses a process of subjecting polyamide 6 or the like to solid phase polymerization in steam atmosphere to prevent the formation of gelated products. However, there is no description as to essential properties of the melt-polymerized polymer to be subjected to solid phase polymerization.

Japanese Patent Application Laid-Open No. 1-284526 (1989) discloses a process for producing ultra-high molecular weight polyamide 66 by subjecting polyamide 66 having a specific end group balance to solid phase polymerization. However, the end group balance ranges from diamine excess to dicarboxylic acid excess. Therefore, the object of the proposed process is to produce polyamide 66 having a number-average molecular weight of 100,000 or higher, and there is no teaching about the reduction of gels and fish eyes.

Japanese Patent Application Laid-Open No. 4-197710 (1992) describes a method of crystallizing polyester chips. In this method, synthetic resin chips as a fed material are crystallized in a channel stirring heating apparatus while forming water film on the chips by feeding water or steam to the heating apparatus. As described above, since the channel stirring heating apparatus is used, the obtained products are likely to have deteriorated quality due to yellowing, etc. Thus, the method is unsuitable for the production of the polyamide of the present invention.

In Japanese Patent Application Laid-Open No. 56-149431 (1981), proposed is a process for subjecting polytetramethylene adipamide to solid phase polymerization in a steam-containing atmosphere to prevent coloring of products. In this process, a prepolymer containing an excessive amount of 1,4-diaminobutane is used as a starting material. Thus, the process is considerably inconsistent with the characteristic feature of the present invention to use polyamide having a specific end group balance, i.e., an excessive amount of carboxyl end groups, as a starting material.

Japanese Patent Applications Laid-Open Nos. 57-200420 (1982) and 58-111829(1983) disclose methods for producing polyamide by melt-polymerizing a diamine component composed mainly of m-xylylenediamine with a dicarboxylic acid component composed mainly of adipic acid. Also, Japanese Patent Application Laid-Open No. 02-245026 (1990) discloses a solid phase-polymerized polymer of m-xylylene adipamide. However, there is no description about solid phase-polymerized polymers containing reduced amounts of gels or fish eyes.

As mentioned above, with respect to polyamides comprising a diamine component composed mainly of m-xylylenediamine and a dicarboxylic acid component composed mainly of adipic acid, solid phase-polymerize polyamides which have been successfully reduced in the amounts of gels and fish eyes are not known in the art.

SUMMARY OF THE INVENTION

It is an object of the present invention to provide a solid phase-polymerized, medium- to high-viscosity polyamide containing gels or fish eyes in small amounts, which comprises a diamine component composed mainly of m-xylylenediamine and a dicarboxylic acid component composed mainly of adipic acid, and which is suitable for use in various applications such as bottles, sheets, films, fibers or the like.

It is another object of the present invention to provide a solid phase-polymerized, medium- to high-viscosity polyamide containing gels or fish eyes in small amounts and having a uniform degree of polymerization, which is efficiently produced by solid phase polymerization using single heating apparatus without needing any pre-treatment using a separate crystallization apparatus.

As a result of extensive studies, the inventor has found that a solid phase-polymerized polyamide having a specific range of relative viscosity and satisfying a specific relationship between relative viscosity and number average molecular weight, which is produced by solid phase polymerization of a melt-polymerized polyamide comprising a diamine component composed mainly of m-xylylenediamine and a carboxylic acid component composed mainly of adipic acid and having a specific relative viscosity and a specific end group balance, is a medium- to high-viscosity, solid phase-polymerized polyamide in which a high molecular weight (increase in viscosity) is achieved mainly by linear molecular growth due to amide bond formation during the solid phase polymerization, and the amounts of gels or fish eyes are extremely small. Further, it has been found that a medium- to high-viscosity polyamide containing gels and fish eyes in extremely small amounts and having a uniform degree of polymerization is obtained, while effectively preventing polyamide granules from tackifiedly sticking or solidifiedly sticking to inner walls of a heating apparatus, by carrying out solid phase polymerization of a melt-polymerized polyamide in a batchwise heating apparatus after adjusting a water content to a specific level and then crystallizing the polyamide under heating. The present invention has been attained on the basis of these findings.

Thus, in a first aspect of the present invention, there is provided a solid phase-polymerized polyamide which is produced by solid phase polymerization of a melt-polymerized polyamide obtained by polycondensing in molten state a diamine component containing not less than 80 mol % of m-xylylenediamine with a dicarboxylic acid component containing not less than 80 mol % of adipic acid, the melt-polymerized polyamide satisfying the following formulae (A) and (B):

$$1.83 \leq a \leq 2.28 \tag{A}$$

$$8 \mu eq/g \leq b \leq 82 \mu eq/g \tag{B}$$

wherein "a" is a relative viscosity measured at 25° C. on a solution of 1 g of the melt-polymerized polyamide in 100 cc of 96% sulfuric acid (weight basis, and the same is applied hereinbelow) and "b" is [COOH]–[NH$_2$] wherein [COOH] is a concentration ($\mu$eq/g) of end carboxyl groups and [NH$_2$] is a concentration ($\mu$eq/g) of end amino groups; and the solid phase-polymerized polyamide satisfying the following formulae (C) and (D):

$$16500 < 16200 \times d - c < 20000 \tag{C}$$

$$2.30 \leq d \leq 4.20 \tag{D}$$

wherein "d" is a relative viscosity measured at 25° C. on a solution of 1 g of the solid phase-polymerized polyamide in 100 cc of 96% sulfuric acid and "c" is a number average molecular weight calculated from $2 \times 10^6 / ([COOH]+[NH_2])$.

In a second aspect of the present invention, there is provided a solid phase-polymerized polyamide satisfying the following formulae (C) and (D):

$$16500 < 16200 \times d - c < 20000 \tag{C}$$

$$2.30 \leq d \leq 4.20 \tag{D}$$

wherein "d" is a relative viscosity measured at 25° C. on a solution of 1 g of the solid phase-polymerized polyamide in 100 cc of 96% sulfuric acid and "c" is a number average molecular weight calculated from $2 \times 10^6 / ([COOH]+[NH_2])$, the solid phase-polymerized polyamide being produced by a process comprising the following sequential steps of (1) polycondensing in molten state a diamine component containing not less than 80 mol % of m-xylylene diamine with a dicarboxylic acid component containing not less than 80 mol % of adipic acid, thereby obtaining a melt-polymerized polyamide having a crystallinity of not more than 13% and satisfying the following formulae (A) and (B):

$$1.83 \leq a \leq 2.28 \tag{A}$$

$$8 \mu eq/g \leq b \leq 82 \mu eq/g \tag{B}$$

wherein "a" is a relative viscosity measured at 25° C. on a solution of 1 g of the melt-polymerized polyamide in 100 cc of 96% sulfuric acid and "b" is [COOH]–[NH$_2$] wherein [COOH] is a concentration ($\mu$eq/g) of end carboxyl groups and [NH$_2$] is a concentration ($\mu$eq/g) of end amino groups; (2) charging the melt-polymerized polyamide into a batchwise heating apparatus and controlling a total water content in the batchwise heating apparatus to not less than 0.2% by weight based on the charged weight of the melt-polymerized polyamide; (3) heating the melt-polymerized polyamide to 60 to 160° C. in an atmosphere having an oxygen concentration of not more than 5% by volume without removing water from the batchwise heating apparatus while controlling a maximum temperature of a heat-transfer surface of the batchwise heating apparatus within 120 to 230° C., thereby promoting crystallization of the melt-polymerized polyamide; and (4) reducing an inner pressure of the batchwise heating apparatus to not more than 66500 Pa (500 torr) when a crystallinity of said melt-polymerized polyamide reaches at least 15%, and then heating further the melt-polymerized polyamide at a temperature at least 15° C. lower than the melting point thereof.

DETAILED DESCRIPTION OF THE INVENTION

The melt-polymerized polyamide used in the present invention may be polyamides obtained by melt-polycondensing a diamine component containing not less than 80 mol % of m-xylylenediamine with a dicarboxylic acid component containing not less than 80 mol % of adipic acid. As polyamide-constituting compounds other than m-xylylenediamine and adipic acid, there may be used lactams such as caprolactam, valerolactom, laurolactam and undecalactam; aminocarboxylic acids such as 11-aminoundecanoic acid and 12-aminododecanoic acid; diamines such as tetramethylenediamine, hexamethylenediamine, 1,3-bis(aminomethyl)cyclohexane, p-xylylenediamine and o-xylylenediamine; and dicarboxylic acids such as succinic acid, sebacic acid, dodecanedioic acid, isophthalic acid, terephthalic acid and 2,6-naphthalene dicarboxylic acid, though not limited thereto.

Like other crystalline polymers having intermolecular hydrogen bonds, the glass transition temperature of the melt-polymerized polyamide decreases when water enters into amorphous regions thereof, thereby lowering the crystallization initiating temperature and increasing the crystallization speed. However, in polymers exhibiting an extremely high crystallization speed even in the absence of water (e.g., nylon 6, nylon 66, etc.), in polymers whose crystallization speed is hardly susceptible to water, in polymers having a low water absorption capacity (e.g., polyesters), or in polymers whose glass transition temperature and crystallization temperature are very close to each other without water, substantially no effect of controlling the water content is obtained because of too much or too little influence by water. Since the influence of water on the melt-polymerized polyamide used in the present invention is more moderate than that on nylon 6 but greater than that on polyethylene terephthalate, the effect of controlling the water content is remarkable in the present invention. Specifically, when the water content of the melt-polymerized polyamide having a crystallinity of not more than 13% is controlled to a specific range, the temperature range within which the polyamide exhibits tackiness upon heating becomes lowered and the period during which the tackiness is maintained is shortened, thereby preventing the polyamide granules from tackifiedly sticking, and as a result thereof, avoiding the solidified sticking of polyamide granules to the interior surface of a heating apparatus.

The melt-polymerized polyamide used in the present invention is a crystallizable polyamide showing, when measured by differential scanning calorimetry (DSC), a definite endothermic peak attributable to fusion. The crystallinity of the polyamide after solid phase polymerization reaches as high as not less than 20%. Incidentally, the crystallinity of the melt-polymerized polyamide is preferably not more than 13%. The melt-polymerized polyamide is usually granulated by water-cooling after the melt-polymerization to have a crystallinity of not more than 13%. In the present invention, the crystallinity of the polymers was determined from a heat of fusion of crystals measured by differential scanning calorimetry (DSC).

The melt-polymerized polyamide used in the present invention has a relative viscosity of preferably 1.83 to 2.28, more preferably 1.87 to 2.24. With a relative viscosity of not less than 1.83, the polyamide exhibits an appropriate viscosity in molten state, and is quite easily formed into strands when being taken out of a polymerization vessel, resulting in good workability. Further, with a relative viscosity of not more than 2.28, the polyamide is kept in uniform molten state in the polymerization vessel, thereby enabling to produce polyamides having a uniform degree of polymerization. In addition, damages of polyamide molecules due to increased heat history in molten state is prevented, and aberrant reactions such as non-linear molecular growth is effectively inhibited.

With respect to the end group balance of the melt-polymerized polyamide, i.e., the balance between the concentration of end carboxyl groups and the concentration of end amino groups, it is preferable that the concentration of end carboxyl groups is larger than the concentration of end amino groups, and the difference thereof is preferably 8 to 82 $\mu$eq/g, more preferably 10 to 74 $\mu$eq/g. It can be readily expected that the polymerization time in either molten and solid states becomes shortest to result in minimized damages to polyamide molecules when the difference is zero, because the amide bond formation is fastest. However, as a result of studies by the inventor, viscosity increase due to undesirable reactions other than ordinary amide bond formation has been found during solid phase polymerization, when the difference between the concentrations of end carboxyl groups and end amino groups is less than 8 $\mu$eq/g, i.e., when the end amino groups are present in a higher concentration than that prescribed in the present invention. This increase in the viscosity is presumed to be attributable to non-linear molecular growth, and is largely responsible for the formation of gels or fish eyes in the obtained polymer. By regulating the difference to not more than 82 $\mu$eq/g, the speed of amide bond formation is maintained within practical level and the polymerization time in either molten or solid states is inhibited from being excessively prolonged, this in turn preventing damages to polyamide molecules and reducing the amounts of gels or fish eyes. Thus, the inventor has found that there is an optimum range in the end group balance, which has not been conventionally considered, to obtain solid phase-polymerized polyamides containing less amounts of gels and fish eyes.

The melt-polymerized polyamide having the above properties can be produced by a polycondensation process including at least one step being proceeded in molten state. For instance, the melt-polymerized polyamide can be produced by a polycondensation of a nylon salt of m-xylylenediamine and adipic acid in molten state while heating an aqueous solution of the nylon salt under pressure and then removing water and condensation water, an atmospheric polycondensation by directly adding m-xylylenediamine into molten adipic acid, etc. The reaction conditions of the polycondensation are not particularly restricted. The charge ratio of the starting compounds, polymerization catalyst, polymerization temperature and polymerization time may be appropriately selected based on ordinary knowledge known in the polymer production art, thereby to produce the melt-polymerized polyamide having the above properties, especially the relative viscosity and the end group balance.

Like the melt-polymerized polyamide, the solid phase-polymerized polyamide has a balance of the end carboxyl group concentration and the end amino group concentration in which the concentration of end carboxyl groups is larger than that of end amino groups. Specifically, the difference thereof is preferably 8 to 82 $\mu$eq/g, more preferably 10 to 74 $\mu$eq/g. The reasons for controlling the end group balance within the above range are described above. The relative viscosity of the solid phase-polymerized polyamide is in the range of 2.30 to 4.20. With a relative viscosity of not less than 2.30, the solid phase-polymerized polyamide maintains a suitable viscosity practically required in molding it into bottles, films, sheets, fibers or the like. Further, by adjusting the relative viscosity to not more than 4.20, the solid phase polymerization time is prevented from being excessively prolonged, and damages to polyamide molecules and undesirable reactions other than amide bond formation are also inhibited.

In the solid phase-polymerized polyamide polymer according to the present invention, the relative viscosity (d) and the number average molecular weight (c) satisfy the following relationship:

$$16500 \leq 16200 \times d - c \leq 20000,$$

preferably satisfy the following relationship:

$$16800 \leq 16200 \times d - c \leq 19500.$$

When the above relationship is satisfied, the increase of molecular weight (increase in viscosity) of the polyamide is achieved mainly by linear molecular growth due to amide bond formation, resulting in production of the solid phase-polymerized polyamide having a medium to high viscosity and less amounts of gels or fish eyes.

The melt-polymerized polyamide preferably has a number average molecular weight of about 11,500 to about 19,000. The solid phase-polymerized polyamide preferably has a number average molecular weight of about 19,500 to about 50,000.

The water content is preferably not less than 0.2% by weight based on the weight of the melt-polymerized polyamide in view of preventing the solidified sticking of polyamide granules, and preferably not less than 0.3% by weight in view of preventing both the tackified sticking and solidified sticking of polyamide granules. Further, in considering to facilitate the drying step after crystallization and the dehydration during solid-phase polymerization, the water content is still more preferably 0.3 to 5% by weight.

The water content may be controlled by a method where melt-polymerized polyamide granules are first allowed to absorb moisture or water by utilizing their water-absorbing properties until an intended level of water content is reached, and then the resultant polyamide granules are fed into a batchwise heating apparatus. Alternatively, the water content may be regulated by introducing ice, water or steam together with the melt-polymerized polyamide granules into a batchwise heating apparatus. In this method, an excess of water which is not absorbed to polyamide may be present in the batchwise heating apparatus. In the present invention, the method of controlling the water content is not limited thereto.

After controlling the water content, the melt-polymerized polyamide is subjected to solid phase polymerization. In the present invention, the solid phase polymerization may be carried out in two steps as described below.

The first step of the solid phase polymerization is a pretreatment until the crystallinity of the polyamide reaches at least 15%. When the crystallinity reaches 15% or higher, the polyamide becomes extremely resistant to cause the tackified sticking or solidified sticking. However, when the polyamide is transformed from amorphous state into crystalline state upon heating, the polyamide granules come to quite readily tackifiedly stick to each other or tackifiedly stick to the interior wall of a heating apparatus. For this reason, in the first step, the crystallization of the polyamide is accelerated by the presence of water while preventing the tackified sticking of polyamide granules. Accordingly, it should be avoided to carry out the first step under reduced pressure so as to prevent water in the heating apparatus from easily escaping out of the heating apparatus. Reduced pressure is also undesirable in view of reaching a solid phase polymerization temperature within a short period of time by facilitating heat transfer in the temperature region. The interior of a batchwise heating apparatus may be maintained either under atmospheric pressure or under pressure. However, it is not necessarily required to pressurize the interior of the heating apparatus as long as the batchwise heating apparatus has a structure which prevents water contributing to controlling the water content from easily escaping out of the heating apparatus. Also, the temperature of heating medium contacting a heat transfer surface of the heating apparatus is not required to be reduced to prevent the polyamide granules from tackifiedly sticking, and can be set to an intended maximum temperature.

As described above, since the first step is carried out without reducing pressure, the polyamide is inevitably contacted with oxygen. Therefore, the polyamide is likely to be deteriorated due to oxygen. In order to avoid this problem, it is required to maintain the oxygen concentration of the atmosphere inside the heating apparatus at a low level. Specifically, the oxygen concentration is preferably not more than 5% by volume, more preferably not more than 1% by volume, and still more preferably 0.1% by volume. For the same reasons, the polyamide granules may be maintained at a temperature of 60 to 160° C.

The second step of the solid phase polymerization is a step of drying and subsequently subjecting the polyamide to solid phase polymerization after the crystallinity reaches at least 15% in the first step. In the second step, the interior of the heating apparatus is maintained under reduced pressure to efficiently remove water present in the heating apparatus in the first step, water adsorbed on the polyamide and condensation water generated during the polycondensation as well as to avoid oxidation of the polyamide. The reduced pressure is preferably not more than 66500 Pa (500 torr), more preferably not more than 13300 Pa (100 torr), and still more preferably not more than 3990 Pa (30 torr). At this time, in order to avoid the tackified sticking, the polyamide is preferably maintained at a temperature at least 15° C. lower than the melting point thereof, more preferably at a temperature of 210° C. or lower.

In either the first or second steps, the maximum temperature of the heat transfer surface of the heating apparatus for heating the polyamide is preferably in the range of 120 to 230° C. A maximum temperature not less than 120° C. prevents the time required for completing the whole steps from being unfavorably prolonged, while a maximum temperature not more than 230° C. prevents the polyamide granules from being heated close to the melting point thereof, thereby inhibiting the polyamide granules from tackifiedly sticking to the interior wall of the heating apparatus.

As the heating apparatus for use in the solid phase polymerization, a batchwise heating apparatus may be preferably used rather than a continuous eating apparatus, because the batchwise heating apparatus is highly gastight and effectively prevents the polyamide from contacting with oxygen. More preferably, there may be used rotary drum heating apparatuses such as a Tumbling dryer, a Conical dryer and a Rotary dryer, or a conical heating apparatus equipped with inner rotary blades, i.e., so-called Nauta mixer, though not limited thereto.

The operating conditions of a batchwise heating apparatus, namely the moving speed of the polyamide granules in the heating apparatus is not critical so long as the granules are uniformly heated therein. In this regard, an extremely high moving speed is not required to prevent the polyamide granules from tackifiedly sticking. The moving speed of the polyamide granules varies depending upon the filling rate and the stirring speed. Therefore, to achieve uniform heating of the polyamide granules, the stirring speed is required to be increased when the filling rate is higher but required to be decreased when the filling rate is lower. For instance, when a rotary drum is used, the rotation speed is preferably 0.5 to 30 rpm for a filling rate of less than 40% by volume, while preferably 2 to 60 rpm for a filling rate of not less than 40% by volume. However, the present invention is not limited to the above operating conditions as long as the polyamide granules are uniformly heated in the heating apparatus.

Further, in the present invention, the solid phase-polymerized polyamide is extremely reduced in damages to molecules and substantially free from aberrant reactions such as non-linear molecular growth, resulting in extremely small amounts of formation of gels and fish eyes. As will be described below, the gel concentration (concentration of substances insoluble in 96% sulfuric acid) of the solid phase-polymerized polyamide of the present invention is preferably less than 0.1% by weight when measured after melting treatment at 275° C. for 30 hours.

As described in detail, the solid phase-polymerized polyamide of the present invention has the following advantages.

(a) Since it is a medium- to high-viscosity polyamide containing less amounts of gels and fish eyes and having a uniform degree of polymerization, it is suitable for use in production of bottles, sheets, films, fibers and the like.

(b) Since the polyamide undergoes much less damages to molecules and minimized aberrant reactions such as non-linear molecular growth, the resultant polyamide is little deteriorated at stagnating portions of a molding apparatus.

(c) Since the solid-phase polymerized polyamide contains less amounts of gels and fish eyes, the filter used in molding is prevented from clogging so that the pressure rise is inhibited and the frequency of replacement of the filter is reduced, resulting in considerably high productivity.

(d) Since the solid-phase polymerized polyamide contains less amounts of gels and fish eyes, molded products obtained therefrom is less defective and the number of defective products is reduced, resulting in high productivity.

(e) Since polyamide granules having a crystallinity of not more than 13% are smoothly crystallized in a batchwise heating apparatus, no preliminary apparatus for crystallization is additionally required. Therefore, the crystallization and the solid phase polymerization is carried out using only one apparatus.

(f) The heat transfer is efficient before and after the crystallization due to the presence of water (steam), thereby enabling to shorten the temperature rise time.

(g) Since the polyamide granules are charged into a batchwise heating apparatus in a high filling rate, the productivity is enhanced.

(h) It is not necessary to increase the moving speed of polyamide granules in a batchwise heating apparatus, resulting in saving of power used.

(i) The polyamide granules are prevented from tackifiedly sticking in a batchwise heating apparatus, so that loads on the heating apparatus such as decentering, power fluctuation, disturbed rotation or the like are considerable reduced.

(j) Since the polyamide granules are heated in a batchwise heating apparatus, the polyamide is free from deterioration in quality such as yellowing and generation of fine powders and the amount of inert gas used is reduced as compared with using a channel stirring heating apparatus.

The present invention will be described in detail below by examples and comparative examples. The respective properties were measured and evaluated as follows.

(1) Relative Viscosity (a and d)

One gram of polyamide was accurately weighed and dissolved in 100 cc of 96% sulfuric acid at a temperature of 20 to 30° C. while stirring. After completely dissolved, 5 cc of the obtained solution was immediately fed into a Cannon-Fenske viscometer. After allowing the viscometer to stand in a thermostatic oven at 25° C.±0.03° C. for 10 minutes, the falling time (t) of the solution was measured. Similarly, the falling time ($t_0$) of 96% sulfuric acid solely was measured. The relative viscosity of the polyamide was calculated from the measured values t and $t_0$ according to the following formula (E):

$$\text{Relative viscosity} = t/t_0 \tag{E}$$

(2) Concentration of End Amino Groups

Into 30 cc mixed solvent of phenol and ethanol in a volume ratio of 4:1, was dissolved 0.3 to 0.5 g of polyamide accurately weighed at a temperature of 20 to 30° C. while stirring. After completely dissolved, the obtained solution was subjected to neutralization titration with an aqueous N/100 hydrochloric acid solution while stirring.

(3) Concentration of End Carboxyl Groups

Into 30 cc benzyl alcohol, was dissolved 0.3 to 0.5 g of polyamide accurately weighed at a temperature of 160 to 180° C. under nitrogen stream while stirring. After completely dissolved, the obtained solution was cooled to 80° C. or lower under nitrogen stream and added with 10 cc of methanol while stirring, followed by neutralization titration with an aqueous N/100 sodium hydroxide solution.

(4) Number Average Molecular Weight (c)

From the measured concentrations of end amino groups and end carboxyl groups, the number average molecular weight was calculated according to the following formula (F):

$$\text{Number average molecular weight} = 2 \times 10^6 / ([NH_2] + [COOH]) \tag{F}$$

wherein $[NH_2]$ is the concentration ($\mu$eq/g) of end amino groups and $[COOH]$ is a concentration ($\mu$eq/g) of end carboxyl groups.

(5) Gel Concentration

One gram of polyamide was accurately weighed and dissolved in 100 cc of 96% sulfuric acid at room temperature over 24 hours. The obtained solution was filtered through a glass filter (3G) with a known weight. The filter was sufficiently washed with 96% sulfuric acid and then with methanol. After drying the filter in vacuum at 100° C. for 24 hours, the weight of the filter was measured. The gel concentration was expressed by the calculated concentration of substances insoluble in sulfuric acid.

(6) Water Content (wt. %)

The water content was measured on 2 g of polyamide pellets using Karl-Fischer micro-moisture meter (CA-05 Model) and a vaporizer (VA-05 Model) both manufactured by Mitsubishi Chemical Corp. under vaporizing conditions of melting point thereof for 30 minutes.

EXAMPLES 1–2 and COMPARATIVE EXAMPLE 1

[Melt Polymerization for Production of Poly-m-xylylene Adipamide]

After polycondensing m-xylylenediamine and adipic acid in a molten state for a predetermined time, the resultant polymer was taken out through a nozzle disposed at a lower portion of the polymerization vessel in the form of strands, which was then cooled with water and cut into pellets to obtain a melt-polymerized poly-m-xylylene adipamide. The properties of the obtained poly-m-xylylene adipamide are shown in Table 1.

[Solid Phase Polymerization of Poly-m-xylylene Adipamide]

Into a 1000 cc round-bottom flask, were placed 200 g of the poly-m-xylylene adipamide pellets. The flask was immersed in an oil bath, and rotated at 40 rpm using a drive unit of an evaporator. The flask was evacuated to 133 Pa (1 torr) or less and then returned to ordinary pressure by filling with nitrogen with 99 vol. % or higher purity. This procedure was repeated three times. Thereafter, the temperature of the oil bath was raised from room temperature to 220 to 230° C. at a temperature rise rate of 80° C./hour, thereby heating the polyamide pellets to conduct solid phase polymerization. When the crystallization of the pellets was completed and then the pellet temperature reached 140° C., the evacuation of the flask was started. After the pellet temperature reached 205° C., about 4 g of the pellets were sampled. Subsequently, while maintaining the pellet temperature at 205° C., about 4 g of the pellets were sampled every 90 minutes. After 270 minutes from reaching 205° C., the flask was returned to ordinary pressure by introducing nitrogen, and then the heating of the oil bath was stopped. The relative viscosities and number average molecular weights measured during the solid phase polymerization are shown in Table 1. The relationship between the relative viscosities and the number average molecular weights is shown in FIG. 1.

TABLE 1

|  | Example 1 | Example 2 | Comparative Example 1 |
|---|---|---|---|
| Amorphous poly-m-xylylene adipamide |  |  |  |
| Relative viscosity | 2.13 | 2.21 | 2.21 |
| [COOH]- [NH$_2$] ($\mu$eq/g) | 39 | 10 | −14 |
| After maintained at 205° C. for 0 min. |  |  |  |
| Relative viscosity (d) | 2.38 | 2.49 | 2.51 |
| Number average molecular weight (c) | 19900 | 22800 | 20600 |
| 16200 × d − c | 18700 | 17500 | 20100 |
| After maintained at 205° C. for 90 min. |  |  |  |
| Relative viscosity (d) | 2.88 | 3.45 | 3.70 |
| Number average molecular weight (c) | 27800 | 37100 | 36100 |
| 16200 × d − c | 18900 | 18800 | 23800 |
| After maintained at 205° C. for 180 min. |  |  |  |
| Relative viscosity (d) | 3.11 | 3.92 | 4.97 |
| Number average molecular weight (c) | 32000 | 45700 | 47600 |
| 16200 × d − c | 18400 | 17800 | 32900 |
| After maintained at 205° C. for 270 min. |  |  |  |
| Relative viscosity (d) | 3.19 | 4.26 | 5.78 |
| Number average molecular weight (c) | 34300 | 49600 | 55900 |
| 16200 × d − c | 17400 | 19400 | 37700 |

Figure 1:
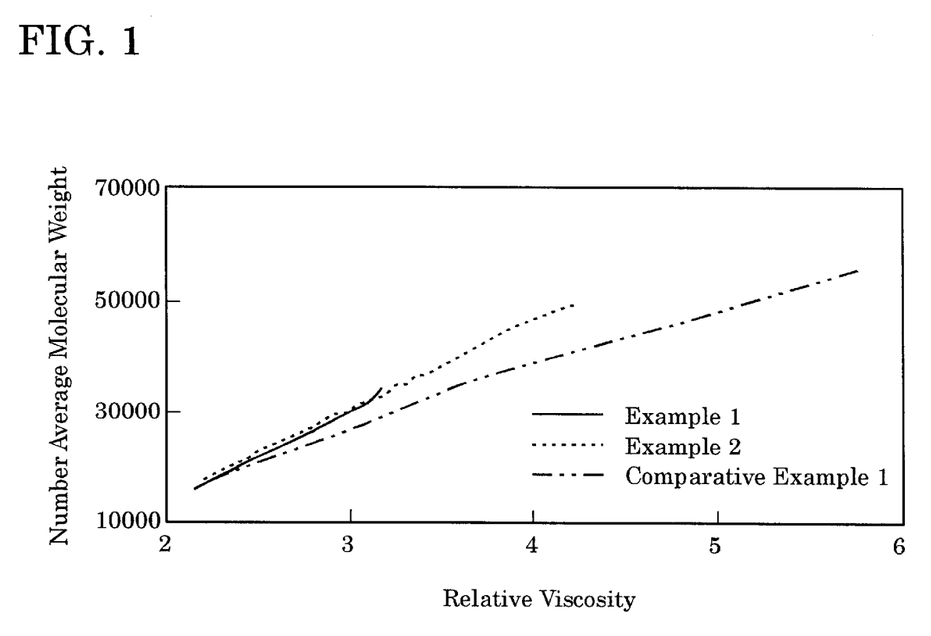
FIG. 1 is a graph showing change of number average molecular weight with increasing relative viscosity during solid phase polymerization measured in Examples 1 and 2 and Comparative Example 1.

As is apparent from Table 1 and FIG. 1, when [COOH]-[NH$_2$] was 39 $\mu$eq/g (Example 1) and 10 $\mu$eq/g (Example 2), the relative viscosity and the number average molecular weight of poly-m-xylylene adipamide increased during the solid phase polymerization in similar manners to satisfy the formula (C). However, when [COOH]-[NH$_2$] was −14 $\mu$eq/g (Comparative Example 1), the number average molecular weight was increased more slowly as compared with the relative viscosity, thereby failing to satisfy the formula (C), and losing constant relationship between the decrease in the end group concentration of the polyamide molecules and the increase in the relative viscosity. This could be considered that the increase in molecular weight was caused by a reaction other than ordinary amide bond formation accompanied with the decrease in end group concentration, and as a result thereof, the viscosity was increased.

EXAMPLE 3 and COMPARATIVE EXAMPLE 2

[Solid Phase Polymerization of Poly-m-xylylene Adipamide]

Into a stainless rotary drum heating apparatus with a capacity of 0.25 m$^3$, were charged 100 kg pellets of melt-polymerized poly-m-xylylene adipamide having properties shown in Table 2, and the heating apparatus was rotated at 5 rpm. The procedures of evacuating the heating apparatus to 133 Pa (1 torr) or less and then returning to ordinary pressure by introducing nitrogen with 99 vol. % or higher purity were repeated three times. Thereafter, the polyamide pellets were heated by raising the temperature of heating medium from room temperature to 230° C. to carry out solid phase polymerization. After crystallization of the pellets was completed and the pellet temperature reached 140° C., the evacuation was started. When the pellet temperature reached 200° C., nitrogen was introduced into the heating apparatus to return the inner pressure to ordinary pressure. Then, the pellets were cooled to 60° C. by heat exchange between the heating medium and water, thereby obtaining solid phase-polymerized poly-m-xylylene adipamide. Relative viscosities thereof are shown in Table 2.

[Melt Stagnation Test]

In a hard glass test tube (25 mm$\phi$, 200 mm long), were placed 20 g of the solid phase-polymerized poly-m-xylylene adipamide thus obtained, which were then melted at 275° C. while passing nitrogen through the space in the test tube and maintained in a molten state for 30 hours. Thereafter, while flowing nitrogen, the molten polymer was cooled to room temperature. The results of measurement of gel concentrations of the samples thus treated are shown in Table 2.

TABLE 2

|  | Example 3 | Comparative Example 2 |
|---|---|---|
| Amorphous poly-m-xylylene adipamide |  |  |
| Relative viscosity | 2.12 | 2.06 |
| [COOH] — [NH$_2$] ($\mu$eq/g) | 16 | −18 |
| Solid phase-polymerized poly-m-xylylene adipamide |  |  |
| Relative viscosity (d) | 2.61 | 2.63 |
| Number average molecular weight (c) | 23900 | 20400 |
| 16200 × d − c | 18400 | 22200 |
| Gel concentration | ≦0.1 | 5 |

As is apparent from Table 2, when [COOH]-[NH$_2$]) was −18 $\mu$eq/g (Comparative Example 2), an extremely large amount of gels was produced during a long period of stagnation in molten state. On the other hand, when [COOH]-[NH$_2$] was 16 $\mu$eq/g (Example 3), substantially no gel was produced.

EXAMPLE 4 and COMPARATIVE EXAMPLE 3

[Melt Polymerization for Production of Poly-m-xylylene Adipamide]

After polycondensing m-xylylenediamine and adipic acid in a molten state for a predetermined time, the resultant polymer was taken out through a nozzle disposed at a lower portion of the polymerization vessel in the form of strands, which was then cooled with water and cut into pellets to obtain a melt-polymerized poly-m-xylene adipamide. The properties of the obtained poly-m-xylylene adipamide are shown in Table 3.

[Solid Phase Polymerization of Poly-m-xylylene Adipamide]

Then, into a stainless rotary drum heating apparatus with a capacity of 0.25 m³, were charged 135 kg pellets of the melt-polymerized poly-m-xylylene adipamide obtained above, and the heating apparatus was rotated at 5 rpm. The procedures of evacuating the heating apparatus to 133 Pa (1 torr) or less and then returning to ordinary pressure by introducing nitrogen with 99 vol. % or higher purity were repeated three times. Thereafter, the rotation of the heating apparatus was stopped and distilled water was added thereinto under a nitrogen stream to adjust the water content to the predetermined level, followed by rotating the heating apparatus again at 5 rpm. Then, the pellets were heated by raising the temperature of heating medium from room temperature to 230° C. At this time, the oxygen concentration of the atmosphere in the heating apparatus was not more than 1% by volume. After crystallization of the pellets was completed and the pellet temperature reached 140° C., the evacuation was started to maintain the heating apparatus at 3990 Pa (30 torr) or lower. When the pellet temperature reached 200° C., nitrogen was introduced into the heating apparatus to return the inner pressure to ordinary pressure. Then, the pellets were cooled to 60° C. by heat exchange between the heating medium and water, thereby obtaining solid phase-polymerized poly-m-xylylene adipamide. When the inner wall of the heating apparatus was observed after the solid phase polymerization, no solidified sticking of the pellets thereto was recognized. The results of quality analysis of the solid phase-polymerized polyamide are shown in Table 3.

[Melt Stagnation Test]

In a hard glass test tube (25 mmø, 200 mm long), were placed 20 g of the solid phase-polymerized poly-m-xylylene adipamide thus obtained, which were then melted at 275° C. while passing nitrogen through the space in the test tube and maintained in a molten state for 30 hours. Thereafter, while flowing nitrogen, the molten polymer was cooled to room temperature. The results of measurement of gel concentrations of the samples thus treated are shown in Table 3.

COMPARATIVE EXAMPLE 4

[Solid Phase Polymerization of Poly-m-xylylene Adipamide]

Into a stainless rotary drum heating apparatus with a capacity of 0.25 m³, were charged 100 kg pellets of the melt-polymerized poly-m-xylylene adipamide used in Example 4, and the heating apparatus was rotated at 5 rpm. Then, the heating apparatus was evacuated and the pellets were heated by raising the temperature of heating medium from room temperature to 230° C. while maintaining at 3990 Pa (30 torr) or lower, thereby conducting the solid phase polymerization. When the pellet temperature reached 200° C., nitrogen was introduced into the heating apparatus to return the inner pressure to ordinary pressure. Then, the pellets were cooled to 60° C. by heat exchange between the heating medium and water. When the inner heat transfer surface (inner wall) of the heating apparatus was observed after the solid phase polymerization, the solidified sticking of the pellets was recognized throughout the entire surface of the inner wall. After removing from the heating apparatus the pellets not solidifiedly stuck, the solidifiedly stuck pellets were sampled to measure the solidifiedly stuck amount and relative viscosity. The results of quality analysis of the pellets not solidifiedly stuck, which were regarded as solid phase-polymerized poly-m-xylylene adipamide, are shown in Table 3.

[Melt Stagnation Test]

The same measurement of gel concentration as in Example 4 was performed on the solid phase-polymerized poly-m-xylylene adipamide obtained above. The results are shown in Table 3.

TABLE 3

|  | Example 4 | Comparative Example 3 | Comparative Example 4 |
|---|---|---|---|
| Amorphous poly-m-xylylene adipamide |  |  |  |
| Relative viscosity | 2.12 | 2.06 | 2.12 |
| [COOH]-[NH$_2$] (µeq/g) | 16 | −18 | 16 |
| Water content (wt. %) | 0.18 | 0.14 | 0.18 |
| Amount charged (kg) | 135 | 135 | 100 |
| Amount of distilled water (wt. %) | 0.3 | 0.3 | 0 |
| Pellet temperature at start of evacuation | 140 | 140 | room temp. |
| Pellets solidifiedly stuck to wall surface |  |  |  |
| Amount (wt. %) | 0 | 0 | 6 |
| Relative viscosity | — | — | 2.93 |
| Solid polymerized poly-m-xylylene adipamide |  |  |  |
| Relative viscosity (d) | 2.69 | 2.70 | 2.72 |
| Number-average molecular weight (c) | 25700 | 23300 | 26500 |
| 16200 × d − c | 17900 | 20400 | 17600 |
| Water content (%) | 0.03 | 0.03 | 0.02 |
| Gel concentration | ≤0.1 | 5 | ≤0.1 |

As is apparent from Table 3, when [COOH]−[NH$_2$] was −18 µeq/g (Comparative Example 3), an extremely large amount of gels was produced during the long period of stagnation in molten state. When [COOH]−[NH$_2$] was 16 µeq/g (Example 4 and Comparative Example 3), substantially no gel was produced. When the poly-m-xylylene adipamide was heated from room temperature under reduced pressure (Comparative Example 4), solidified sticking of the pellets to the inner wall of the heating apparatus was more remarkable as compared with the case where the water content was appropriately controlled, irrespective of a smaller charging amount (good stirring and mixing conditions). Further, the viscosity of the solidifiedly stuck pellets was higher than that of the pellets not solidifiedly stuck, and a solid phase-polymerized product having a uniform degree of polymerization was not obtained. The reason for such failure is suggested as follows. The heating of poly-m-xylylene adipamide from room temperature under reduced pressure made the interior of the heating apparatus dried in the crystallization temperature range, so that the crystallization of the pellets was not promoted due to the absence of water. Further, since the temperature range at which the pellets showed tackiness was shifted to higher temperature side, the pellets tackifiedly stack and solidifiedly stack to the interior of the heating apparatus without disintegration even after crystallization.

What is claimed is:

1. A solid phase-polymerized polyamide which is produced by solid phase polymerization of a melt-polymerized polyamide obtained by polycondensing in molten state a diamine component containing not less than 80 mol % of m-xylylenediamine with a dicarboxylic acid component containing not less than 80 mol % of adipic acid, said melt-polymerized polyamide satisfying the following formulae (A) and (B):

$$1.83 \leq a \leq 2.28 \tag{A}$$

$$8 \ \mu eq/g \leq b \leq 82 \ \mu eq/g \tag{B}$$

wherein "a" is a relative viscosity measured at 25° C. on a solution of 1 g of said melt-polymerized polyamide in 100 cc of 96% sulfuric acid and "b" is [COOH]−[NH$_2$] wherein [COOH] is a concentration ($\mu$eq/g) of end carboxyl groups and [NH$_2$] is a concentration ($\mu$eq/g) of end amino groups; and said solid phase-polymerized polyamide satisfying the following formulae (C) and (D):

$$16500 \leq 16200 \times d - c \leq 20000 \tag{C}$$

$$2.30 \leq d \leq 4.20 \tag{D}$$

wherein "d" is a relative viscosity measured at 25° C. on a solution of 1 g of said solid phase-polymerized polyamide in 100 cc of 96% sulfuric acid and "c" is a number average molecular weight calculated from $2 \times 10^6/([COOH]+[NH_2])$.

2. The solid phase-polymerized polyamide according to claim 1, wherein said number average molecular weight is 19500 to 50000.

3. The solid phase-polymerized polyamide according to claim 1, wherein said melt-polymerized polyamide has a crystallinity of not more than 13%.

4. The solid phase-polymerized polyamide according to claim 1, wherein a gel concentration expressed by a concentration of substances insoluble in 96% sulfuric acid is less than 0.1% by weight when measured after melt-treatment at 275° C. for 30 hours.

5. The solid phase-polymerized polyamide according to claim 1, wherein the polyamide is poly-m-xylylene adipamide.

6. A solid phase-polymerized polyamide satisfying the following formulae (C) and (D):

$$16500 \leq 16200 \times d - c \leq 20000 \tag{C}$$

$$2.30 \leq d \leq 4.20 \tag{D}$$

wherein "d" is a relative viscosity measured at 25° C. on a solution of 1 g of said solid phase-polymerized polyamide in 100 cc of 96% sulfuric acid and "c" is a number average molecular weight calculated from $2 \times 10^6/([COOH]+[NH_2])$, said solid phase-polymerized polyamide being produced by a process comprising the following sequential steps of:

(1) polycondensing in molten state a diamine component containing not less than 80 mol % of m-xylylene diamine with a dicarboxylic acid component containing not less than 80 mol % of adipic acid, thereby obtaining a melt-polymerized polyamide having a crystallinity of not more than 13% and satisfying the following formulae (A) and (B):

$$1.83 \leq a \leq 2.28 \tag{A}$$

$$8 \ \mu eq/g \leq b \leq 82 \ \mu eq/g \tag{B}$$

wherein "a" is a relative viscosity measured at 25° C. on a solution of 1 g of said melt-polymerized polyamide in 100 cc of 96% sulfuric acid and "b" is [COOH]−[NH$_2$] wherein [COOH] is a concentration ($\mu$eq/g) of end carboxyl groups and [NH$_2$] is a concentration ($\mu$eq/g) of end amino groups;

(2) charging said melt-polymerized polyamide into a batchwise heating apparatus and controlling a total water content in said batchwise heating apparatus to not less than 0.2% by weight based on the charged weight of said melt-polymerized polyamide;

(3) heating said melt-polymerized polyamide to 60 to 160° C. in an atmosphere having an oxygen concentration of not more than 5% by volume without removing water from said batchwise heating apparatus while controlling a maximum temperature of a heat-transfer surface of said batchwise heating apparatus within 120 to 230° C., thereby promoting crystallization of said melt-polymerized polyamide; and (4) reducing an inner pressure of said batchwise heating apparatus to not more than 66500 Pa when a crystallinity of said melt-polymerized polyamide reaches at least 15%, and then heating further said melt-polymerized polyamide at a temperature at least 15° C. lower than the melting point thereof.

7. The solid phase-polymerized polyamide according to claim 6, wherein said water content is controlled by moisture absorption or water absorption of said melt-polymerized polyamide.

8. The solid phase-polymerized polyamide according to claim 6, wherein said water content is controlled by adding water or steam to said batchwise heating apparatus.

9. The solid phase-polymerized polyamide according to claim 6, wherein said batchwise heating apparatus is a rotary drum.

10. The solid phase-polymerized polyamide according to claim 6, wherein said temperature at least 15° C. lower than the melting point is not more than 210° C.

11. The solid phase-polymerized polyamide according to claim 6, wherein said oxygen concentration of the step (3) is not more than 1% by volume.

12. The solid phase-polymerized polyamide according to claim 6, wherein said step (4) is carried out under a reduced pressure of not more than 13300 Pa.

13. The solid phase-polymerized polyamide according to claim 6, wherein the polyamide is poly-m-xylylene adipamide.

14. The solid phase-polymerized polyamide according to claim 1, wherein said solid phase-polymerized polyamide has a crystallinity of at least 20%.

15. The solid phase-polymerized polyamide according to claim 1, wherein "b" is 10 $\mu$eq/g $\leq$ b $\leq$ 74 $\mu$eq/g.

16. The solid phase-polymerized polyamide according to claim 1, wherein $16800 \leq 16200 \times d - c \leq 19500$.

17. The solid phase-polymerized polyamide according to claim 6, wherein the total water content is controlled, in charging the melt-polymerized polyamide into the batchwise heating apparatus, to not less than 0.3% by weight.

18. The solid phase-polymerized polyamide according to claim 6, wherein the total water content is controlled, in charging the melt-polymerized polyamide into the batchwise heating apparatus, to 0.3 to 5% by weight.

* * * * *